(12) United States Patent
Rankin

(10) Patent No.: US 11,487,674 B2
(45) Date of Patent: Nov. 1, 2022

(54) VIRTUAL MEMORY POOL WITHIN A NETWORK WHICH IS ACCESSIBLE FROM MULTIPLE PLATFORMS

(71) Applicant: John Rankin, Columbus, OH (US)

(72) Inventor: John Rankin, Columbus, OH (US)

(73) Assignee: Rankin Labs, LLC, Williamsport, OH (US)

( * ) Notice: Subject to any disclaimer, the term of this patent is extended or adjusted under 35 U.S.C. 154(b) by 40 days.

(21) Appl. No.: 16/850,211

(22) Filed: Apr. 16, 2020

(65) Prior Publication Data

US 2020/0334168 A1    Oct. 22, 2020

Related U.S. Application Data

(60) Provisional application No. 62/835,031, filed on Apr. 17, 2019.

(51) Int. Cl.
*G06F 12/1009* (2016.01)
*G06F 3/06* (2006.01)

(52) U.S. Cl.
CPC ........ *G06F 12/1009* (2013.01); *G06F 3/0604* (2013.01); *G06F 3/067* (2013.01); *G06F 3/0665* (2013.01); *G06F 2212/65* (2013.01)

(58) Field of Classification Search
CPC .. G06F 12/1009; G06F 3/0604; G06F 3/0665; G06F 3/067; G06F 2212/65
See application file for complete search history.

(56) References Cited

U.S. PATENT DOCUMENTS

| | | | |
|---|---|---|---|
| 3,688,090 A | 8/1972 | Rankin | |
| 4,493,027 A | 1/1985 | Katz et al. | |
| 5,522,045 A * | 5/1996 | Sandberg | G06F 12/1072 709/215 |
| 5,829,041 A * | 10/1998 | Okamoto | G06F 12/1072 711/147 |
| 5,897,664 A * | 4/1999 | Nesheim | G06F 12/0284 711/206 |
| 5,918,229 A * | 6/1999 | Davis | G06F 11/0757 711/147 |
| 6,023,724 A | 2/2000 | Bhatia et al. | |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Ryan Bertram
(74) *Attorney, Agent, or Firm* — Standley Law Group LLP; Jeffrey S. Standley; Adam J. Smith

(57) ABSTRACT

Systems and methods for operating a virtual memory pool are disclosed. A network of computing machines having local real memory is provided. A translation table, which is not tightly coupled to the real memory of any one of the computing machines in the network, is generated comprising connections between locations of the various local real memories to segments of the virtual memory pool. A request is received to access a particular segment of the virtual memory pool. An address for a particular computing machine and a location in its local real memory is retrieved from the translation table. A copy of the particular segment is requested from the particular computing machine.

15 Claims, 4 Drawing Sheets

(56) References Cited

U.S. PATENT DOCUMENTS

| | | | |
|---|---|---|---|
| 6,243,789 B1 | 6/2001 | Hasbun et al. | |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 7,409,525 B1* | 8/2008 | Clark | G06F 12/1072 711/206 |
| 7,702,743 B1* | 4/2010 | Wong | G06F 12/1036 709/216 |
| 8,090,866 B1 | 1/2012 | Bashyam et al. | |
| 8,374,091 B2 | 2/2013 | Chiang | |
| 8,397,151 B2 | 3/2013 | Salgado et al. | |
| 9,350,663 B2 | 5/2016 | Rankin | |
| 10,860,228 B1 | 12/2020 | Mulani et al. | |
| 2001/0017844 A1 | 8/2001 | Mangin | |
| 2001/0019614 A1 | 9/2001 | Madoukh | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2003/0031198 A1 | 2/2003 | Currivan et al. | |
| 2003/0065688 A1 | 4/2003 | Dageville et al. | |
| 2004/0044872 A1* | 3/2004 | Scott | G06F 12/1072 711/202 |
| 2005/0105506 A1 | 5/2005 | Birdwell et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0259587 A1 | 11/2006 | Ackerman et al. | |
| 2006/0265554 A1* | 11/2006 | Carter | G06F 12/0822 711/144 |
| 2007/0025388 A1 | 2/2007 | Abhishek et al. | |
| 2007/0028121 A1 | 2/2007 | Hsieh | |
| 2007/0112714 A1 | 5/2007 | Fairweather | |
| 2007/0180041 A1* | 8/2007 | Suzuoki | H04L 67/1097 709/207 |
| 2007/0223395 A1 | 9/2007 | Lee et al. | |
| 2007/0283125 A1 | 12/2007 | Manczak et al. | |
| 2008/0086620 A1* | 4/2008 | Morris | G06F 12/1072 711/203 |
| 2008/0104313 A1 | 5/2008 | Chu | |
| 2009/0089537 A1* | 4/2009 | Vick | G06F 12/1072 711/203 |
| 2009/0204763 A1* | 8/2009 | Shum | G06F 12/0828 711/119 |
| 2010/0049922 A1* | 2/2010 | Aronovich | G06F 9/524 711/147 |
| 2010/0103830 A1 | 4/2010 | Salgado et al. | |
| 2010/0321397 A1* | 12/2010 | Ginzburg | G06F 12/109 345/531 |
| 2011/0072234 A1* | 3/2011 | Chinya | G06F 12/121 711/207 |
| 2011/0149891 A1 | 6/2011 | Ramakrishna | |
| 2011/0231630 A1 | 9/2011 | Dannowski et al. | |
| 2011/0238793 A1 | 9/2011 | Bedare et al. | |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0091102 A1 | 4/2013 | Nayak | |
| 2014/0089585 A1* | 3/2014 | Nakajima | G06F 13/1663 711/118 |
| 2014/0095810 A1* | 4/2014 | Loewenstein | G06F 12/12 711/148 |
| 2014/0100014 A1 | 4/2014 | Bennett, III et al. | |
| 2014/0254598 A1 | 9/2014 | Jha et al. | |
| 2014/0280669 A1 | 9/2014 | Harper, III et al. | |
| 2014/0294019 A1 | 10/2014 | Quan et al. | |
| 2015/0052323 A1 | 2/2015 | Noel et al. | |
| 2015/0100613 A1 | 4/2015 | Osiecki et al. | |
| 2015/0134930 A1* | 5/2015 | Huang | G06F 12/1009 711/206 |
| 2015/0229714 A1 | 8/2015 | Venkatsubra et al. | |
| 2015/0370720 A1* | 12/2015 | Rowlands | G06F 12/0817 711/133 |
| 2016/0034397 A1 | 2/2016 | Lam et al. | |
| 2016/0077976 A1 | 3/2016 | Raikin et al. | |
| 2016/0170896 A1 | 6/2016 | Steiss | |
| 2016/0171399 A1 | 6/2016 | Santhanam et al. | |
| 2016/0269294 A1 | 9/2016 | Rankin | |
| 2016/0294983 A1* | 10/2016 | Kliteynik | G06F 12/0802 |
| 2017/0010900 A1 | 1/2017 | Cobb | |
| 2017/0054720 A1* | 2/2017 | Geng | H04L 67/1097 |
| 2017/0090872 A1 | 3/2017 | Mathew et al. | |
| 2017/0235499 A1* | 8/2017 | Xu | G06F 3/0608 711/170 |
| 2018/0018147 A1 | 1/2018 | Sugawara | |
| 2018/0060244 A1 | 3/2018 | Godard et al. | |
| 2018/0102975 A1 | 4/2018 | Rankin | |
| 2018/0203805 A1 | 7/2018 | Hatta et al. | |
| 2018/0227264 A1* | 8/2018 | Krauss | H04L 67/303 |
| 2018/0285262 A1* | 10/2018 | Trikalinou | G06F 12/1036 |
| 2019/0266101 A1 | 8/2019 | Robinson et al. | |
| 2020/0019410 A1 | 1/2020 | Dima et al. | |
| 2020/0183854 A1* | 6/2020 | Johns | G06F 12/1009 |
| 2020/0204343 A1 | 6/2020 | Rankin | |
| 2020/0233668 A1 | 7/2020 | Rankin | |
| 2020/0236026 A1 | 7/2020 | Rankin | |
| 2020/0264970 A1 | 8/2020 | Lee et al. | |
| 2020/0310993 A1* | 10/2020 | Kumar | G06F 3/0647 |
| 2020/0334168 A1 | 10/2020 | Rankin | |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

\* cited by examiner

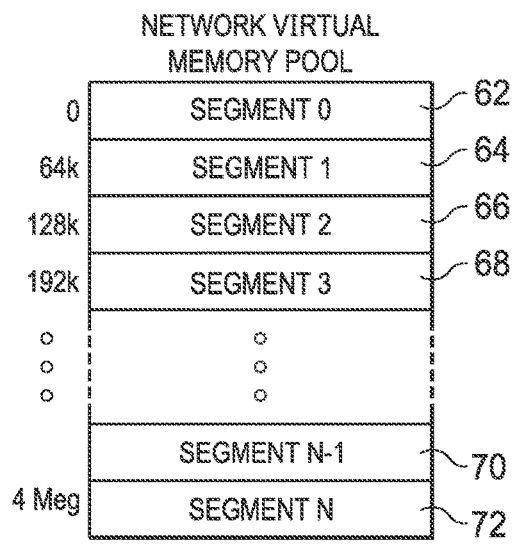
FIG. 3
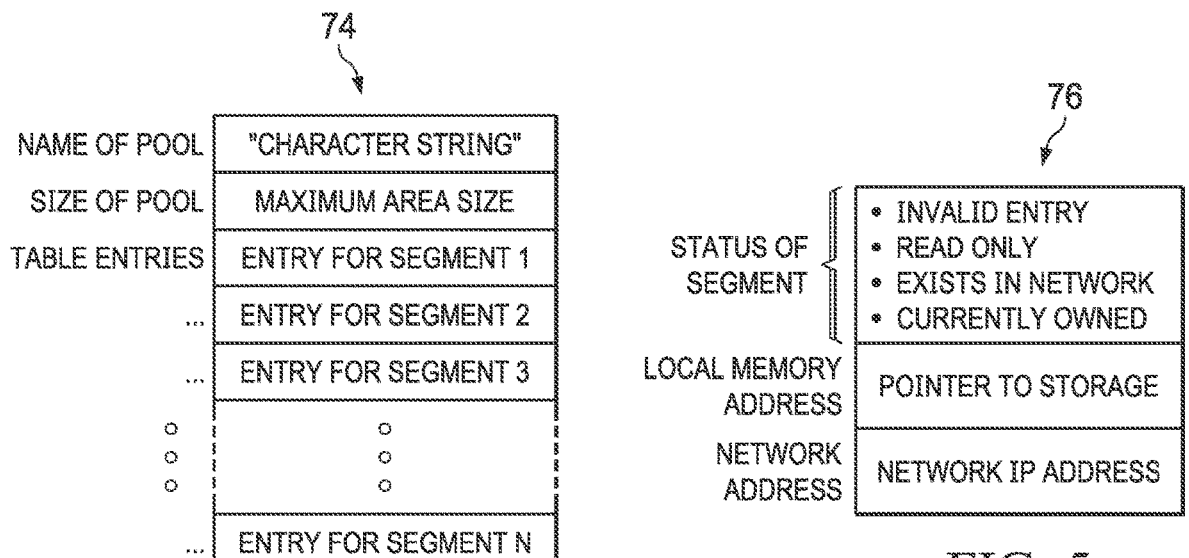
FIG. 4
FIG. 5

VIRTUAL MEMORY POOL WITHIN A NETWORK WHICH IS ACCESSIBLE FROM MULTIPLE PLATFORMS

CROSS-REFERENCE TO RELATED APPLICATIONS

This application claims the benefit of U.S. provisional patent application No. 62/835,031 filed Apr. 17, 2019, the disclosures of which are hereby incorporated by reference as if fully restated herein.

TECHNICAL FIELD

Exemplary embodiments relate generally to systems and methods for virtual memory pools within networks which are accessible from multiple platforms.

BACKGROUND AND SUMMARY OF THE INVENTION

Virtual memory has been in use since at least the 1960s and has allowed computing machines to overcome the limitations imposed by the space, size, and cost of real memory. Early computers were limited to executing and operating upon data that could completely fit within the memory storage that was available within the machine. This storage area was named "real memory", as it actually existed within the physical machine. This limitation significantly influenced the effectiveness of the computing machines and put additional limitations on the types of software programs that could be developed. To resolve this issue, hardware providers created a concept, now often referred to as "virtual storage". Virtual storage allows a software program to utilize more memory than is actually in existence within the machine. This is accomplished by mapping virtual to real addresses and taking advantage of the fact that not all memory is truly needed at all times, and therefore, sections of memory can be paged out or temporarily transferred to disk storage and returned to memory only when needed.

The fundamental idea behind the use of virtual storage is the ability to appear to utilize far more memory space than is actually available. This is made possible because certain locations within memory are used less often than others. The concept is similar to reserves in banking, where the bank holds only the cash that is expected to be used rather than the entire aggregate that might be held in trust. It is unlikely that all customers will ask for all their money, all at the same time. Therefore, the bank needs to only have on hand what the bank reasonably expects will be requested during a given time period.

These disclosures provide systems and methods for virtual memory pools which may be created, managed, and shared between computing machines over networks. The virtual memory pool of storage may be simultaneously utilized by all the machines within a network, and only the portions of the virtual memory pool that are actually in use need to be temporarily stored within a specific machine's real memory. Using these systems and methods, an exceptionally large area of virtual storage may be managed, allowing a great number of sharing computer machines to participate in the virtual memory pool. In this way, a complex and massive parallel processing network of computing may be created, maintained, and operated. Each individual computing machine may be capable of performing its own calculations upon data that is shared by the entire network.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3 is a detailed simplified diagram of the virtual memory pool of FIG. 2;

FIG. 4 is a simplified diagram of an exemplary network virtual translation table for the virtual memory pool of FIG. 2;

FIG. 5 is a simplified diagram of an exemplary table entry for a given segment of the virtual memory pool of FIG. 2.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
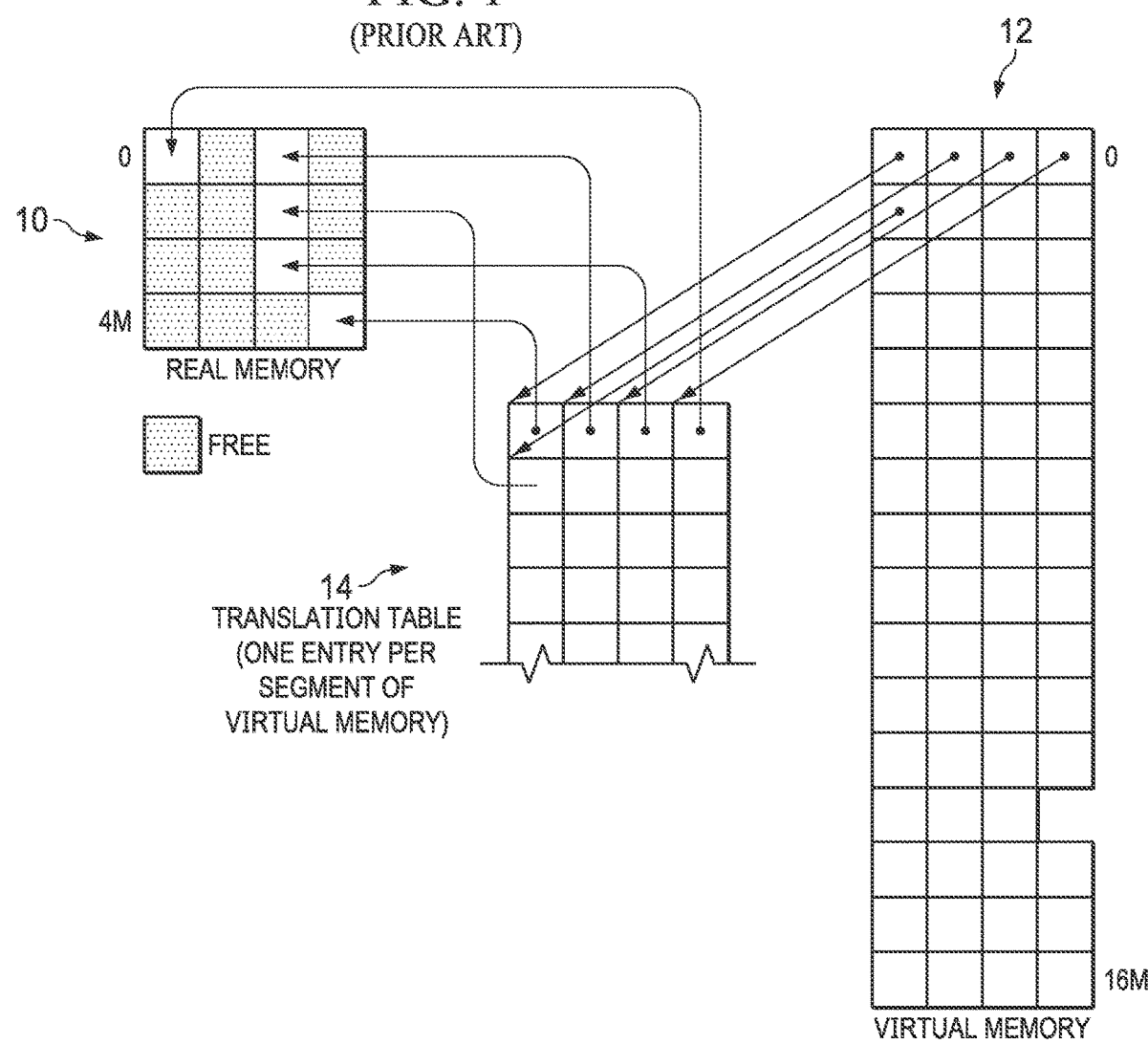
FIG. 1 is a simplified diagram of a traditional virtual memory system.

The traditional use of virtual memory is illustrated in FIG. 1. In the illustrated example, 4M of real memory 10 is used to support and create 16M of virtual memory 12. When access to a piece of real memory 10 is required by a program 16, an address for the portion of real memory 10 is retrieved from a translation table 14. The translation table 14 provides an entry for every segment of the virtual memory 12. By looking up the virtual memory address, the corresponding real memory address of storage that is being used to hold the data may be substituted by a computing machine. If the virtual member 12 is not supported by an equivalent piece of real memory 10, then the translation table 14 is updated. This updating process might require the temporary transfer of data to a more permanent location, like a computer disk or direct access storage device (DASD).

Figure 2:
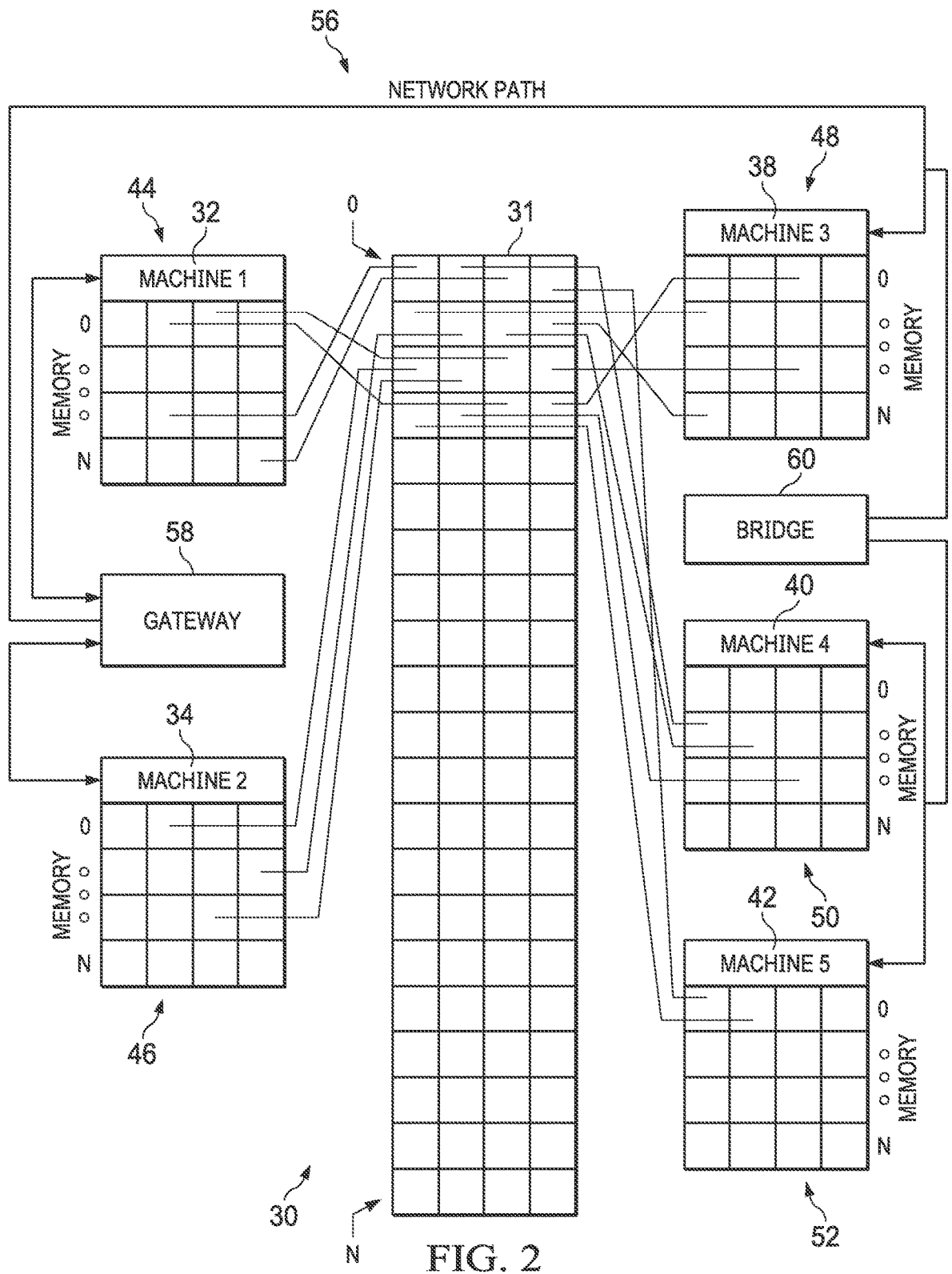
FIG. 2 is a simplified diagram of an exemplary virtual memory pool.

FIG. 2 illustrates an exemplary virtual memory pool 30. The virtual memory pool 30 may be located outside of one or all of the computing machines 32, 34, 36, 38, 40, 42. The virtual memory pool 30 may share its virtual memory among some or all of the multiple computing devices 32, 34, 36, 38, 40, 42. The multiple computing devices 32, 34, 36, 38, 40, 42 may be connected by way of a network 56. Those of skill in the art will recognize that the computing devices 32, 34, 36, 38, 40, 42 may be any type of platform including, but not limited to, desktop computers, laptops, servers, work stations, tablets, mobile devices, smartphones, some combination thereof, of the like. Those of skill in the art will recognize that the network 56 may be an internet, intranet, cellular network, the world wide web, some combination thereof, or the like. Furthermore, the network 56 connections may be wired or wireless. The computing machines 32, 34, 36, 38, 40, 42 may be connected to one another in the network 56 by way of one or more gateways 58, bridges 60, or the like. One or more interconnected networks 56 may be utilized. Any number and type of computing devices 32, 34, 36, 38, 40, 42 may be utilized.

The virtual memory pool 30 may comprise a translation table 31. The translation table 31 may comprise a number of segments 62, 64, 66, 68, 70, 72, each associated with an address for a computing machines 32, 34, 36, 38, 40, 42 and a location in the real memory 44, 46, 48, 50, 52 of the computing machine 32, 34, 36, 38, 40, 42. The translation table 31 may be updated as new segments are filled in, assigned ownership, moved, deleted, transferred ownership, some combination thereof, or the like.

The virtual pool 30 may utilize real memory 44, 46, 48, 50, 52 located at one or more of the computing machines 32, 34, 36, 38, 40, 42 to support the virtual memory pool 30. In exemplary embodiments, each computing machine's 32, 34, 36, 38, 40, 42 real memory 44, 46, 48, 50, 52 may be utilized, though in other exemplary embodiments, only the real memory 44, 46, 48, 50, 52 from a select number of the computing machines may be utilized 32, 34, 36, 38, 40, 42. The real memory 44, 46, 48, 50, 52 may be of any size or type. As those of skill in the art will recognize, the concepts of the disclosed systems and methods are extendable and adaptable to a wide variety of virtual memory pool 30 designs and are not intended to be limited to the exemplary embodiments shown and described herein, which are provided for example purposes.

One exemplary difference between the traditional virtual memory 12 and the virtual memory pool 30 is the immediate proximity of hardware. In the case of the traditional virtual memory 12, the virtual memory 12 space does not separately exist in the physical sense, but the direct hardware controls the use of the virtual memory 12 and allows individual operating instructions to be completely unaware of the absence of the virtual memory 12. This may be accomplished using a hardware translation table 14 which provides the instruction for the real memory 10 that is merely at a different location than imagined, rather than not existing at all. Therefore, the traditional virtual memory 12 model uses the concept of virtual storage to provide greater freedom for instruction and program design but is ultimately confined within the operation of a given computing machine and remains tightly coupled to the computing machine's hardware.

In contrast to the traditional model of virtual storage, the virtual memory pool 30 may not exist at all within the confines of a given computing machine 32, 34, 36, 38, 40, 42. The virtual memory pool 30 may represent a contiguous area of memory that may not exist in a given computing machine 32, 34, 36, 38, 40, 42. In exemplary embodiments, the virtual memory pool 30 may represent a continuous area of memory that does not exist anywhere. Instead, the virtual memory pool 30 may provide a map for exchanging information stored between multiple computing machines 32, 34, 36, 38, 40, 42 of the network 56. The virtual memory pool 30 may not exist within a single computing machine 32, 34, 36, 38, 40, 42. Furthermore, the virtual memory pool 30 may not be tightly coupled to a single computing machine 32, 34, 36, 38, 40, 42.

The virtual memory pool 30 may be of any size. Since there is no limit to the size and shape of this virtual memory pool 30, an example is provided of one large area defined by 32 bits, without limitation. Such an area would have 4,294,967,296 bytes of available storage and would be addressed from 0 through 4,294,967,295 by the 32-bit address value. This large pool would be segmented into portions which may be distributed for use and storage. As an illustration, without limitation, a segment size of 64K, is shown in FIG. 3.

Each segment 62, 64, 66, 68, 70, 72 of the virtual memory pool 30 may be managed as a distributed unit. In other words, a computing machine 32, 34, 36, 38, 40, 42 that participates in using this virtual memory pool 30 may make an announcement to the network 56 concerning ownership or existence of each segment 62, 64, 66, 68, 70, 72. The computing machine 32, 34, 36, 38, 40, 42 of the network 62 that is in control of a given segment 62, 64, 66, 68, 70, 72 may send a copy of the segment 62, 64, 66, 68, 70, 72 to the requesting computing machine 32, 34, 36, 38, 40, 42. The copy of the segment 62, 64, 66, 68, 70, 72 may be sent with an indication that the segment 62, 64, 66, 68, 70, 72 is for reading only. However, if the segment 62, 64, 66, 68, 70, 72 is not in use then the owning computing machine 32, 34, 36, 38, 40, 42 may transmit a copy of the available segment 62, 64, 66, 68, 70, 72, flag their own copy as read only, and relinquish ownership. In this way, segments 62, 64, 66, 68, 70, 72 of storage may be distributed over the network 56 such that no single computing machine 32, 34, 36, 38, 40, 42 is responsible for maintaining the entire pool 30. Furthermore, a member computing machine 32, 34, 36, 38, 40, 42 who is in control of a segment 62, 64, 66, 68, 70, 72 may notify the network 56 when data within the segment 62, 64, 66, 68, 70, 72 has been altered, so as to allow other member computing machines 32, 34, 36, 38, 40, 42 to invalidate their versions of the segment 62, 64, 66, 68, 70, 72.

Figure 6:
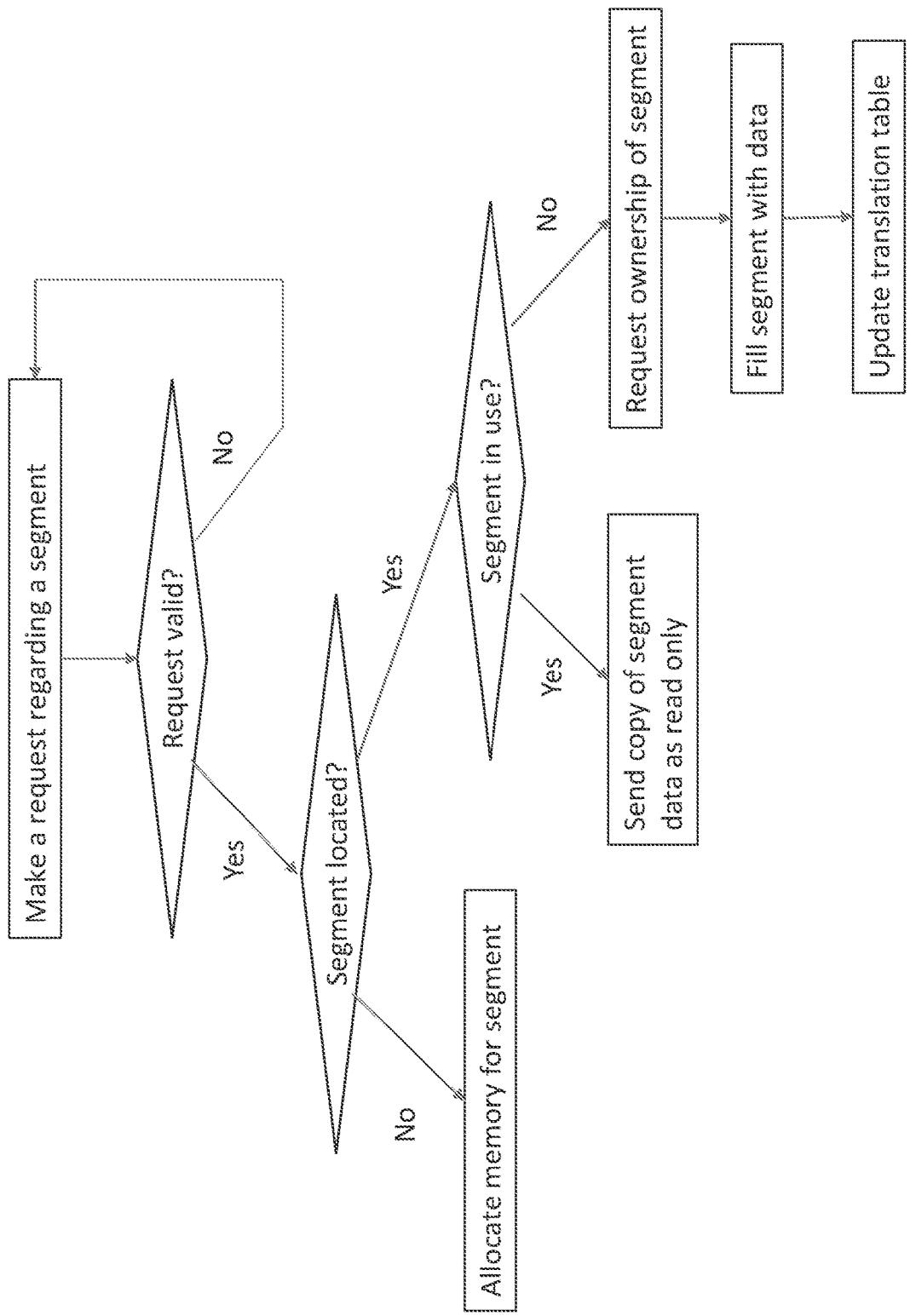
FIG. 6 is a flow chart with exemplary logic for operating the virtual memory pool of FIG. 2.

As illustrated in FIG. 4 through FIG. 6, the translation table 74 and any number of table entries 76 may be used to define and manage the virtual memory pool 30. The translation table 74 may be maintained within the local memory of each computing machine 32, 34, 36, 38, 40, 42 of the network 56, in exemplary embodiments. When a computing machine 32, 34, 36, 38, 40, 42 of the network 56 is inclined to access the real memory 44, 46, 48, 50, 52 of a given computing machine 32, 34, 36, 38, 40, 42 from the network 56, a translation and realization process may occur. This process may involve a determination of the number of segments 62, 64, 66, 68, 70, 72 that contain the data of interest, by way of the translation table 31, and indexing to the appropriate table entry 76 for the segment involved. Once the table entry 76 is located, the location of the real memory 44, 46, 48, 50, 52 may be determined to retrieve the underlying data.

If the entry 76 is determined to be valid, a request to all the computing machines 32, 34, 36, 38, 40, 42 may be transmitted requesting retrieval of the segment 62, 64, 66, 68, 70, 72. If there is no affirmative response from the network 56, the local member computing machine 32, 34, 36, 38, 40, 42 may allocate a sufficient block of local real memory 44, 46, 48, 50, 52 and identify its address in the entry 76 along with indication of ownership.

If the entry 76 is currently owned, the entry 76 may contain a pointer to the location in local real memory 44, 46, 48, 50, 52. A translation between the virtual address requested and the real address pointed to may be accomplished by way of the translation table 74.

If the entry 76 exists in the virtual memory pool 30, the local computing machine 32, 34, 36, 38, 40, 42 may generate and transmit a request to the segment owning computing machine 32, 34, 36, 38, 40, 42 asking for either a read only copy of the segment 62, 64, 66, 68, 70, 72 or for ownership to be transferred. Such a request may be made by way of the network address for the segment owning computing machine 32, 34, 36, 38, 40, 42.

By allowing the free flow of requests, the virtual memory pool 30 may be actualized and each local network member computing machine 32, 34, 36, 38, 40, 42 may have access and availability to the virtual memory pool 30.

The use of the network virtual memory pool 30 may be implemented within an emulated or pseudo process, though such is not required.

As each instruction may be retrieved from a member computing machine 32, 34, 36, 38, 40, 42, access to the virtual storage pool 30 may be provided. As each instruction executes, potential access to the virtual storage pool 30 may be provided. Whenever the virtual storage pool 30 is utilized, a process of address translation between the virtual address and the location in the local real memory 44, 46, 48, 50, 52 where the data segment 62, 64, 66, 68, 70, 72 truly resides may be undertaken.

While five member computing machines 32, 34, 36, 38, 40, 42 are shown and described in the network 56 of the provided example, any number of computing machines 32, 34, 36, 38, 40, 42 are contemplated. Any size virtual memory pool 30 is contemplated. Any size real memory 44, 46, 48, 50, 52 is contemplated. The virtual memory pool 30 may be divided into any number of segments 62, 64, 66, 68, 70, 72 of any size. Any number and type of entries 76 are contemplated. In exemplary embodiments, without limitation, the virtual memory pool 30 may be executed within a virtual pseudo processor or emulator.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose or specialized computing devices. The electronic devices may be personal computers, smartphones, tablets, databases, servers, or the like. The electronic connections described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for operating a virtual memory pool comprising the steps of:
    providing a network comprising computing machines, each of said computing machines comprising local real memory configured to hold segments of data;
    generating a translation table for the virtual memory pool, wherein the virtual memory pool is not tightly coupled to the local real memory of any one of the computing machines in the network, and wherein the virtual memory pool comprises connections between locations of the local real memory of each of the computing machines and each segment of the virtual memory pool;
    generating a request from a first one of the computing machines to access a particular segment;
    determining, at the translation table, that no address or location is stored for the particular segment;
    identifying, at the first one of the computing machines, a location in the real memory of the first one of the computing machines for the particular segment;
    updating, at the first one of the computing machines, a local copy of the translation table with a new entry comprising the address of the first one of the computing machines, the location of the real memory of the first one of the computing machines, and the particular segment;
    notifying a remainder of the computing machines of the updates to the translation table, including at least sending a copy of the address of the first one of the computing machines, the location of the real memory of the first one of the computing machines, and the particular segment as read only to the remainder of the computing machines.

2. The method of claim 1 wherein:
    the virtual memory pool is executed within a virtual pseudo processor.

3. The method of claim 1 wherein:
    the virtual memory pool is executed within an emulator.

4. The method of claim 1 further comprising the steps of:
    determining that the request is valid.

5. The method of claim 1 wherein:
    the network comprises an IP network; and
    each of the computing machines is associated with an IP address; and
    the address is an IP address.

6. The method of claim 5 wherein:
    at least one of said computing machines comprises a personal computer.

7. The method of claim 5 wherein:
    at least one of said computing machines comprises a server.

8. A system for operating a virtual memory pool comprising:
    a number of computing machines;
    a network connecting each of said number of computing machines;
    a translation table comprising a number of entries, wherein each entry is associated with a segment of data, an address for one of the number of computing machines, and a location in real memory of one of the number of computing machines; and software instructions, which when executed by a particular one of the number of computing machines, configures the particular one of the number of computing machines to:

generate and transmit a request regarding a particular segment of data to each of the number of computing devices;

if the request is valid, query the translation table with the particular segment of data;

if the query returns an address and location in real memory associated with the particular segment of data, transmit a request to the address for a read only copy of the particular segment of data at the location in the real memory of the computing machine associated with the address; and if the query does not return an address and location in real memory, request ownership of the particular segment of data, fill the segment of data with information at a new location in the real memory of the particular one of the number of computing machines, update a local copy of the translation table with a new entry comprising the particular segment of data, an address for the particular one of the number of computing machines, and the new location for the particular segment of data, and notifying a remainder of the number of computing machines of the update to the translation table with the address and new location for the particular segment of data by sending a copy of the particular segment of data, the address for the particular one of the number of computing machines, and the new location for the particular segment of data.

9. The system of claim 8 wherein:
the network is an IP network; and
each of the number of computing machines is associated with an IP address.

10. The system of claim 9 wherein:
the network comprises the world wide web.

11. The system of claim 8 wherein:
at least a portion of the translation table is located within the real memory of each of the number of computing machines.

12. The system of claim 11 wherein:
the translation table is located entirely within the real memory of one of the number of computing machines; and
the translation table is executed on each of the number of computing machines by way of a virtual processor or emulator.

13. The system of claim 11 wherein:
a copy of the translation table is maintained within the real memory of each of the number of computing machines.

14. The system of claim 8 wherein:
the translation table is located at a remote electronic storage device not tightly coupled to any of the number of computing machines.

15. A method for operating a virtual memory pool, said method comprising the steps of:

connecting a number of computing machines, each associated with an address and comprising a real memory, to one another by way of an IP network;

creating a translation table by associating each of a number of segments within the virtual memory pool with an address for a particular one of the number of computing machines and a location within the real memory of the particular one of the number of computing machines;

storing a copy of the translation table at the real memory of each of the number of computing machines;

receiving a request at the translation table from one of the number of computing machines regarding a particular segment;

retrieving a particular address and a particular location from the translation table associated with the particular segment of data;

sending a request to the particular address for the segment stored at the particular location;

receiving, at the requesting computing machine from the computing machine associated with the particular address, a read only copy of the segment stored at the particular location;

receiving a request at the translation table from a second one of the number of computing machines regarding a second particular segment;

determining that no address or location is stored at the translation table for the second particular segment;

receiving from the second one of the number of computing machines, a particular location in the real memory of the second one of the number of computing machines for the second particular segment;

creating a new entry at the translation table comprising the address for the second one of the number of computing machines, the particular location, and the second particular segment; and notifying each of the other number of computing machines to update their copy of the translation table with the address for the second one of the number of computing machines, the particular location, and the second particular segment.

* * * * *